United States Patent
Zhang et al.

(10) Patent No.: US 9,384,228 B2
(45) Date of Patent: Jul. 5, 2016

(54) IMPLEMENTING A MULTI-COLUMN/MULTI-ROW CONSTRAINT IN A RELATIONAL DATABASE TABLE

(71) Applicant: Oracle International Corporation, Redwood Shores, CA (US)

(72) Inventors: Zhihai Zhang, Nashua, NH (US); Qingyun Xie, Bedford, NH (US); Siva Ravada, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 356 days.

(21) Appl. No.: 13/782,964

(22) Filed: Mar. 1, 2013

(65) Prior Publication Data

US 2014/0250060 A1    Sep. 4, 2014

(51) Int. Cl.
*G06F 7/00* (2006.01)
*G06F 17/00* (2006.01)
*G06F 17/30* (2006.01)

(52) U.S. Cl.
CPC .............................. *G06F 17/30345* (2013.01)

(58) Field of Classification Search
CPC ................ G06F 17/30286; G06F 17/30572; G06F 17/30864; G06F 17/30392; G06F 17/3056; G06F 17/30595; G06F 17/30604; G06F 17/30371; G06F 17/30539; G06F 17/30958
See application file for complete search history.

(56) References Cited

U.S. PATENT DOCUMENTS

| | | |
|---|---|---|
| 6,381,605 B1 | 4/2002 | Kothuri et al. |
| 6,470,344 B1 | 10/2002 | Kothuri et al. |
| 6,505,205 B1 | 1/2003 | Kothuri et al. |
| 6,735,593 B1 * | 5/2004 | Williams |
| 6,879,980 B1 | 4/2005 | Kothuri et al. |
| 7,080,065 B1 | 7/2006 | Kothuri et al. |
| 7,177,882 B2 | 2/2007 | Xie et al. |
| 7,219,108 B2 | 5/2007 | Kothuri et al. |
| 7,379,936 B2 | 5/2008 | Kothuri et al. |
| 7,454,428 B2 | 11/2008 | Wang et al. |
| 7,490,084 B2 | 2/2009 | Kothuri et al. |
| 7,580,927 B1 | 8/2009 | Abugov et al. |
| 7,640,242 B2 | 12/2009 | Chatterjee et al. |
| 7,747,591 B2 | 6/2010 | Chatterjee et al. |
| 7,774,381 B2 | 8/2010 | Kothuri et al. |
| 7,877,405 B2 | 1/2011 | Kothuri et al. |
| 7,970,742 B2 | 6/2011 | Hanckel et al. |
| 8,145,641 B2 | 3/2012 | Chatterjee et al. |

(Continued)

*Primary Examiner* — Susan Chen
(74) *Attorney, Agent, or Firm* — Vista IP Law Group, LLP

(57) ABSTRACT

A method, system, and computer program product for implementing a multi-column/multi-row constraint. Lock techniques prevent access collisions even when two or more concurrently running software applications are attempting to insert rows into the same relational database table (subject to the same multi-column/multi-row constraints). The method commences by receiving (e.g., from a first process) a first row to be inserted into a relational database table where the row comprises at least two constrained columns corresponding to the multi-column/multi-row constraint, then receiving (e.g., from a second process) a second row to be inserted into the same table. Using column locks, the method recognizes the potential for conflicting row insertions, and manages locks to prevent conflicting access grants to the two constrained columns of the existing database table. The evaluation of the multi-column/multi-row constraint is performed over the first row to be inserted and a row or rows of the relational database table.

20 Claims, 10 Drawing Sheets

(56) References Cited

U.S. PATENT DOCUMENTS

| | | |
|---|---|---|
| 8,156,083 B2 | 4/2012 | Banerjee et al. |
| 8,161,081 B2 * | 4/2012 | Kaufman et al. ............. 707/802 |
| 8,224,871 B2 | 7/2012 | Kothuri et al. |
| 8,228,326 B2 | 7/2012 | Kothuri et al. |
| 8,248,409 B2 | 8/2012 | Kazar et al. |
| 8,269,764 B2 | 9/2012 | Ravada et al. |
| 8,386,468 B2 | 2/2013 | Hu et al. |
| 8,533,181 B2 | 9/2013 | Hu et al. |
| 8,812,488 B2 | 8/2014 | Bamba et al. |
| 2008/0126397 A1 | 5/2008 | Alexander et al. |
| 2009/0100089 A1 * | 4/2009 | Eadon et al. ................... 707/102 |
| 2009/0328043 A1 * | 12/2009 | Vermette et al. .............. 718/101 |
| 2012/0191682 A1 | 7/2012 | Banerjee et al. |
| 2013/0117313 A1 * | 5/2013 | Miao et al. .................... 707/781 |
| 2014/0244635 A1 | 8/2014 | Hu et al. |
| 2014/0270478 A1 | 9/2014 | Chen et al. |

\* cited by examiner

IMPLEMENTING A MULTI-COLUMN/MULTI-ROW CONSTRAINT IN A RELATIONAL DATABASE TABLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of relational database systems and more particularly to techniques for implementing a multi-column/multi-row constraint when inserting rows into a relational database table.

BACKGROUND

Tables comprised of columns and rows have long been used in relational database systems. Improvements deriving from deployments of relational database systems have introduced the notion of constraints into the definition and usage of tables. In legacy systems a table might be constructed of rows of data where each row is comprised of several columns, and each column might be defined to represent certain data values. Further, the values in a column might be constrained (e.g., using some form of a given column constraint) such that the values in the given column conform to the given constraint. As an example, the values in a column might be constrained such that no value in that column can be "null". Other column-wise constraints are present in legacy systems, such as enforcement that a value in a column must be a valid number, or must be a valid date, etc. Moreover some constraints operate over multiple columns in order to enforce the constraint. For example, a multi-column constraint can be described as, "column A must be bigger than column B". Other constraints involve row constraints in the form of enforcing the constraint over multiple rows. For example, constraints called UNIQUE constraints are used to make sure that no two rows have identically the same values in specific columns. In certain situations, it is desired to define a relation that conforms concurrently to both a set of column constraints as well as to a set of row constraints. And, it is desirable to implement such multi-column/multi-row constraints in an efficient manner. In legacy systems, there are no constraints available that operate concurrently on multiple columns and multiple rows in order to enforce such a multi-column/multi-row constraint.

What is needed are techniques to define and implement multi-column/multi-row constraints in an efficient manner. The deficiency in legacy systems (e.g., the lack of efficient relation constraints that operate concurrently on multiple columns and multiple rows in order to enforce the multi-column/multi-row constraint) is further exacerbated when considering that in an enterprise setting, multiple applications being used by multiple users can operate on the tables concurrently, and thus, what's needed are techniques to handle row insertion requests from multiple concurrently executing processes while still enforcing the validity of the row insertions under the regime of a multi-column/multi-row constraint. Moreover, none of the aforementioned technologies have the capabilities to perform the herein-disclosed high-performance (e.g., minimally-blocking) techniques for implementing a multi-column/multi-row constraint when inserting rows into a relational database table. Therefore, there is a need for improved approaches, some of which approaches are disclosed hereunder.

SUMMARY

The present disclosure provides an improved method, system, and computer program product suited to address the aforementioned issues with legacy approaches. More specifically, the present disclosure provides a detailed description of techniques used in methods, systems, and computer program products for implementing a multi-column/multi-row constraint when inserting rows into a relational database table.

A method, system, and computer program product for implementing a multi-column/multi-row constraint. Lock techniques prevent access collisions even when two or more concurrently running software applications are attempting to insert rows into the same relational database table (subject to the same multi-column/multi-row constraints). The method commences by receiving (e.g., from a first process) a first row to be inserted into a relational database table where the row comprises at least two constrained columns corresponding to the multi-column/multi-row constraint, then receiving (e.g., from a second process) a second row to be inserted into the same table. Using column locks, the method recognizes the potential for conflicting row insertions, and manages locks to prevent conflicting access grants to the two constrained columns of the existing database table. The evaluation of the multi-column/multi-row constraint is performed over the first row to be inserted and a row or rows of the relational database table.

Some embodiments prevent conflicting access grants by denying access grants when values of the constrained columns of the first row are different from the values of the constrained columns of the second row. Some embodiments reduce or eliminate processing delays by allowing non-blocking access grants when values of the constrained columns of the first row do not differ from the values of the constrained columns of the second row.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
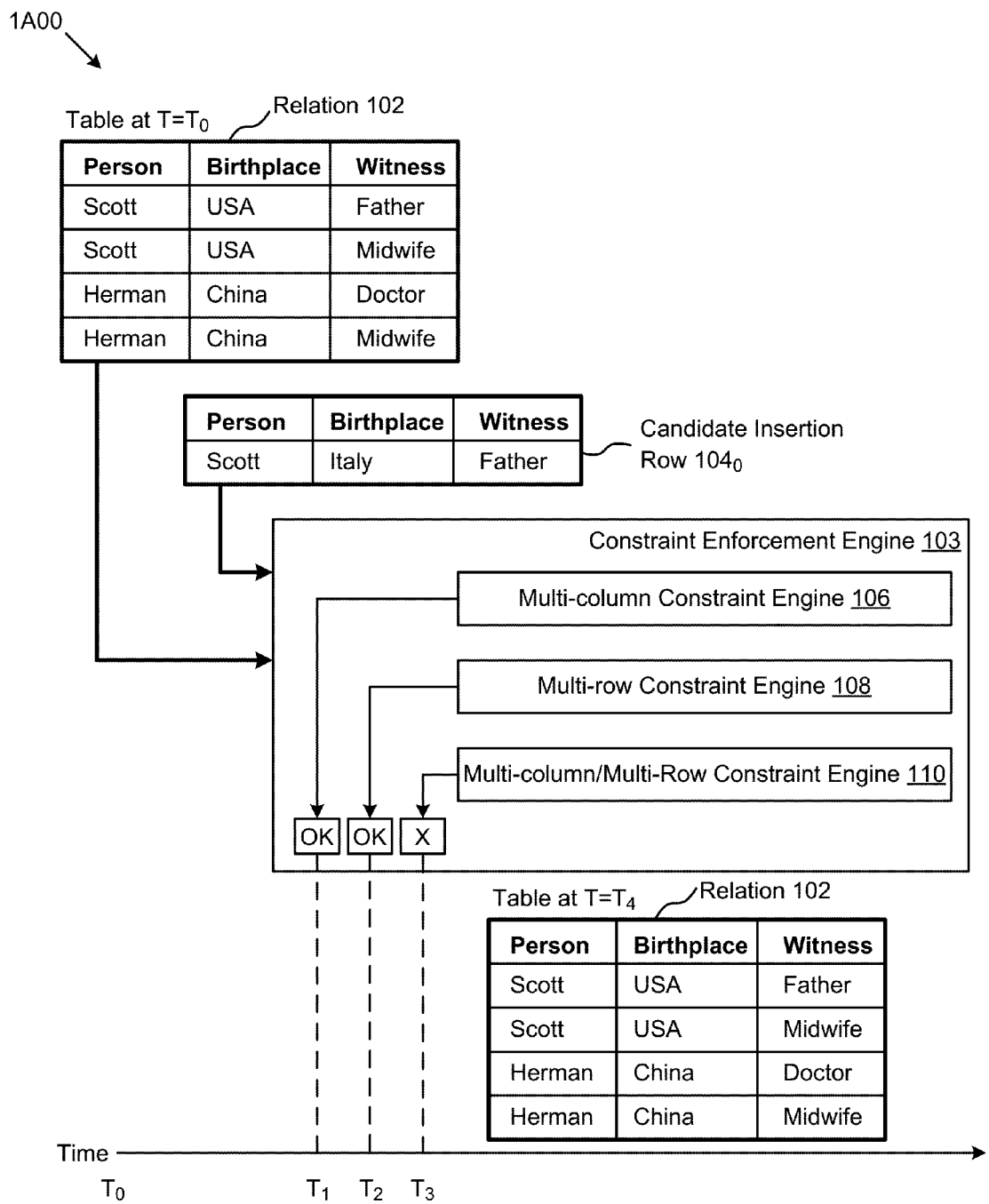
FIG. 1A depicts a rejection case data flow through a constraint enforcement engine used for implementing a multi-column/multi-row constraint when inserting rows into a relational database table, according to some embodiments.

Some embodiments of the present disclosure address the problems attendant to implementing a multi-column/multi-row constraint when inserting rows into a relational database table. Some embodiments are directed to a highly-efficient and minimally-blocking approach that deals with concurrency issues when inserting rows into a relational database table that implements a multi-column/multi-row constraint.

Overview

Modern relational database systems implement various types of constraints that are defined to aid in maintaining consistency of the data stored in the tables. There are constraints that apply over multiple columns, and there are constraints that perform multiple rows tests, but legacy systems do not provide any multi-column/multi-row constraints.

What is needed are solutions for efficiently implementing multi-column/multi-row constraints. A sample multi-column/row table constraint as defined in the following:

Consider a table (column0, ..., columnA, columnB, ... columnN) that has two string columns: columnA and columnB. Now, further consider a constraint such that:

For any two rows {row1, row2} in the table:

If the value of columnA of row1 is equal to the value of columnA of row2 then the value of columnB of row1 must be equal to the value of columnB of row2

This constraint is distinguished from legacy constraints, at least in the aspect that it enforces a relationship that is defined as being between multiple rows and between multiple columns. Following is an example table for elucidating the effects of this multi-column/multi-row constraint. Table 1 lists members (e.g., see the Member column) and records their respective birthplace (e.g., see the Birthplace column) and Witnesses of the birth in the same row.

TABLE 1

Birthplace and Witnesses for Family Members

| Row | Family Member | Birthplace | Witnesses | Comment |
| --- | --- | --- | --- | --- |
| 1 | Scott | USA | Father | <= valid row |
| 2 | Scott | USA | Midwife | <= valid row |

TABLE 1-continued

Birthplace and Witnesses for Family Members

| Row | Family Member | Birthplace | Witnesses | Comment |
| --- | --- | --- | --- | --- |
| 3 | Herman | China | Doctor | <= valid row |
| 4 | Herman | China | Midwife | <= valid row |
| 5 | Scott | Italy | Doctor | <= invalid row, because it conflicts with row 1 and row 2. |

Reading the table from top to bottom then, Scott was born in the USA, and Scott's father and a midwife were also present. Herman was born in China and a doctor and a midwife were also present. The foregoing is captured in the first four data rows of Table 1.

Now, consider the meaning of a needed constraint: There might have also been a doctor present at Scott's birth, and such a row (not shown) could be added. However, it is not possible that Scott was born in the USA and also was born in Italy. Entering a row as depicted in the bottom row of Table 1 would violate the meaning of the needed constraint, and some sort of a constraint violation should be raised when this constraint is active. Now, it is possible that there is indeed a Scott born in Italy, however the constraint ensures that the Scott from Italy should be entered as a different person distinguished from the Scott from the USA. Or, it might have been the case that the constraint violation would be raised because of a coding or a typographical error—perhaps that the row should reflect that birth of Scott from the USA was also witnessed by a doctor.

Enforcing such a multi-column/multi-row constraint can be performed whenever a process requests an insert of a new row into a table to which the constraint applies. And, serialized enforcement can be performed in an environment with many concurrently running process by blocking a second process from modifying the table until the constraint has been tested/satisfied and the row has been entered. Yet, there are techniques to reduce the performance impact of serialized enforcement.

The figures and descriptions below cover:

Techniques to prevent "invalid" rows from being inserting into the table; and

Techniques to allow concurrent insertion for all rows that could not affect the validity of the constraint enforcement steps.

More specifically, the figures and descriptions below cover:

Certain techniques to prevent "invalid" rows from being inserting into the table by checking the columns and rows just before insertion; and Techniques to allow concurrent insertion for all rows that could not affect the validity of the constraint enforcement steps by checking that a candidate row does not have invalid values in either of the columns involved in the multi-column/multi-row constraint.

DEFINITIONS

Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

DESCRIPTIONS OF EXEMPLARY EMBODIMENTS

FIG. 1A depicts a rejection case data flow 1A00 through a constraint enforcement engine used for implementing a multi-column/multi-row constraint when inserting rows into a relational database table. As an option, the present rejection case data flow 1A00 may be implemented in the context of the architecture and functionality of the embodiments described herein. Also, the rejection case data flow 1A00 or any aspect therein may be implemented in any desired environment.

As shown, the relation 102 comprises three columns and four data rows. The state of table at time $T=T_0$ is shown in the upper left portion of FIG. 1A. Also depicted is a row that is intended to be inserted (e.g., candidate insertion row $104_0$). Both the relation 102 and the row that is intended to be inserted are accessed by a constraint enforcement engine 103. The constraint enforcement engine may communicate with other components in a system, and the constraint enforcement engine may in turn comprise a multi-column constraint engine 106, a multi-row constraint engine 108, and a multi-column/multi-row constraint engine 110. Given the shown relation 102 and given the candidate insertion row $104_0$, the constraint enforcement engine 103 performs constraint checks. For example, and as shown, a multi-column constraint engine 106 checks if any multi-column/single-row constraints would be violated by the insertion. In this case there are no multi-column/single-row constraints active that would be violated by the insertion, so the multi-column constraint engine 106 reports "OK" at time $T=T_1$. As another example, and as shown, a multi-row constraint engine 108 checks if any multi-row/single-column constraints would be violated by the insertion. In this case there are no multi-row/single-column constraints active that would violated by the insertion, so the multi-row constraint engine 108 reports "OK" at time $T=T_2$.

In the situation that a multi-column/multi-row constraint is active for the relation, a multi-column/multi-row constraint engine 110 might determine (as shown) that the candidate insertion row $104_0$ (Scott, Italy, Father) would violate an active multi-column/multi-row constraint, then the insertion would be rejected (e.g., see the "X" at time $T=T_3$).

The foregoing is an example where the requested insertion of a candidate insertion row is rejected. It is also possible that the requested insertion of a candidate insertion row is processed, found to conform to the constraint, and is then inserted into the table. For example, there would not be such a conflict for a candidate insertion row presented as (Scott, USA, Doctor). Such a case is shown in FIG. 1B.

Figure 1B:
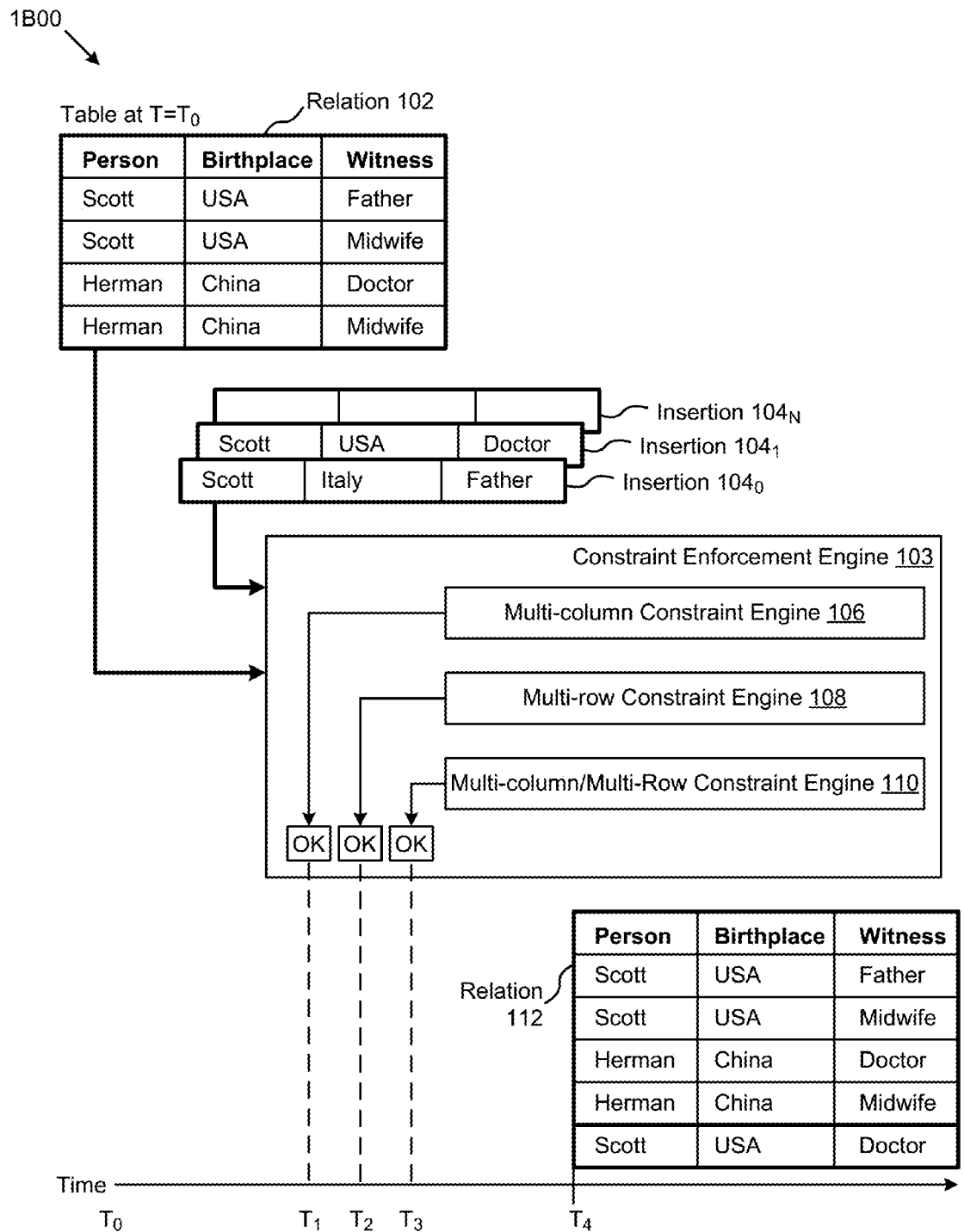
FIG. 1B depicts an insertion case data flow through a constraint enforcement engine used for implementing a multi-column/multi-row constraint when inserting rows into a relational database table, according to some embodiments.

FIG. 1B depicts an insertion case data flow 1B00 through a constraint enforcement engine used for implementing a multi-column/multi-row constraint when inserting rows into a relational database table. As an option, the present insertion case data flow 1B00 may be implemented in the context of the architecture and functionality of the embodiments described herein. Also, the insertion case data flow 1B00 or any aspect therein may be implemented in any desired environment.

As shown, there are several rows (e.g., corresponding to several respective concurrent processes) that are intended to be inserted, shown as candidate insertion row $104_0$, candidate insertion row $104_1$, and candidate insertion row $104_N$.

The relation 102 and the candidate insertion rows are accessed by a constraint enforcement engine. Given the shown relation 102 and given the candidate insertion rows the constraint enforcement engine 103 performs constraint checks. For example, and as shown, a multi-column constraint engine 106 checks if any multi-column/single-row constraints would be violated by the requested insertions. In this case there are no multi-column/single-row constraints active that would violated by the insertion, so the multi-column constraint engine 106 reports "OK" at time $T=T_1$. As another example, and as shown, a multi-row constraint engine 108 checks if any multi-row/single-column constraints would be violated by the insertion. In this case there are no multi-row/single-column constraints active that would violated by the insertion, so the multi-row constraint engine 108 reports "OK" at time $T=T_2$.

In the situation that a multi-column/multi-row constraint is active for the relation, a multi-column/multi-row constraint engine 110 might determine (as shown) that inserting the candidate insertion row would not violate any active multi-column/multi-row constraints (e.g., see the "OK" at time $T=T_3$), then the insertion into the table is performed and the relation 102 is modified by the insertion of candidate insertion row $104_1$ to form relation 112, as shown at $T=T_4$.

The foregoing describes an example where the requested insertion of a candidate insertion row $104_1$ is performed (after checking the active constraints). It is also possible that there are more candidate insertion rows that may or may not satisfy the multi-column/multi-row constraints. It is further possible that, unless safeguards are in place (e.g., a column locking mechanism) a candidate insertion row from one process can alter the table over which the multi-column/multi-row constraint is to be processed.

The further discussions herein describe forms of safeguards that can be put into place within systems for implementing multi-column/multi-row constraints when inserting rows into a relational database table.

As earlier depicted, a particular table might hold constraints of various types, all of which constraint types can be enforced for any candidate insertion. Some of the possibilities of constraints of various types are shown in FIG. 2 and discussed below.

Figure 2:
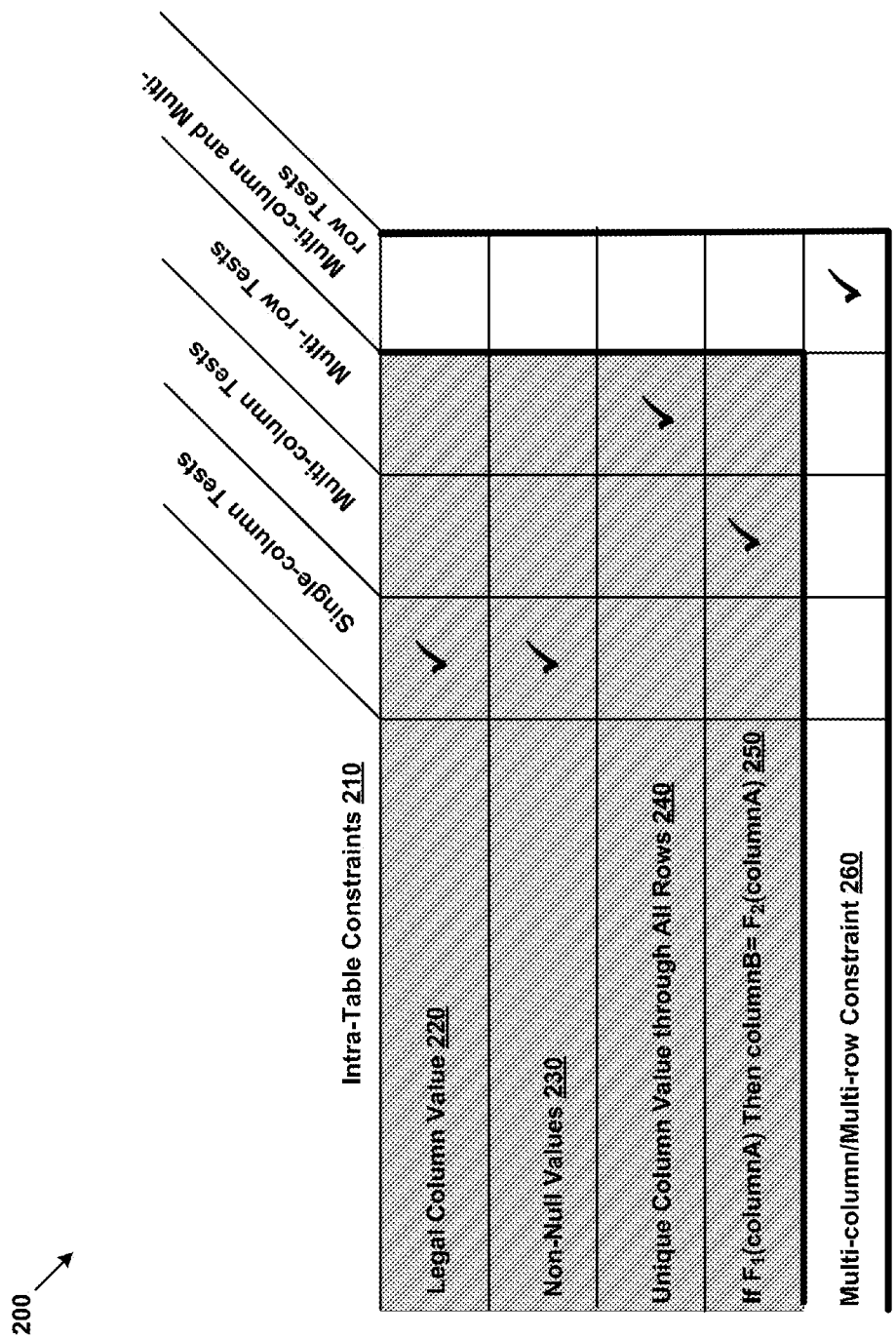
FIG. 2 depicts a constraint-type matrix used in systems for implementing a multi-column/multi-row constraint when inserting rows into a relational database table, according to some embodiments.

FIG. 2 depicts a constraint-type matrix 200 used in systems for implementing a multi-column/multi-row constraint when inserting rows into a relational database table. As an option, the present constraint-type matrix 200 may be implemented in the context of the architecture and functionality of the embodiments described herein. Also, the constraint-type matrix 200 or any aspect therein may be implemented in any desired environment.

As shown, the constraint-type matrix 200 distinguishes multi-column/multi-row constraints from constraints that operate over one or multiple columns (within a single row) or over multiple rows.

More specifically, the constraint-type matrix shows possibilities for constraints, namely:
- single-column constraint;
- multi-column constraint;
- multi-row constraint;
- multi-column and multi-row constraints.

As earlier indicated, database systems often provide a number of different constraints to ensure the data conforms to specific constraints or requirements. Strictly as examples, these include:
- Check: The check constraint allows specification based on a condition over a row in a table.
- NOT NULL: The NOT NULL constraint enforces a column to not accept NULL, values.
- Primary key: The primary key defines a column or combination of columns that contain values that uniquely identify each row in the table.
- Unique: The UNIQUE constraints ensure that no duplicate values are entered in specific columns.
- Foreign key; and
- Others.

Yet, any application of any or all of the above constraints, even in any possible combination, the foregoing types of constraints are still insufficient to implement the needed multi-column/multi-row table constraint. Moreover, in the presence of concurrently running processes (e.g., software applications), it is desired to provide an efficient means of preventing conflicting access grants to the constrained columns of the existing relational database table (e.g., preventing conflicting access grants during the critical region when the multi-column/multi-row constraint is being evaluated).

Strictly to illustrate, the intra-table constraints examples 210 given in the patterned portion of the matrix of FIG. 2 (e.g., legal column value constraint example 220, non-null values constraint example 230, unique column values constraint example 240, and IF/THEN constraint example 250) are not sufficient to implement the needed multi-column/multi-row table constraint (e.g., multi-column/multi-row constraints 260). Thus the multi-column/multi-row table constraint is needed, and is defined as disclosed herein, and can be implemented in various embodiments, as discussed.

Figure 3A:
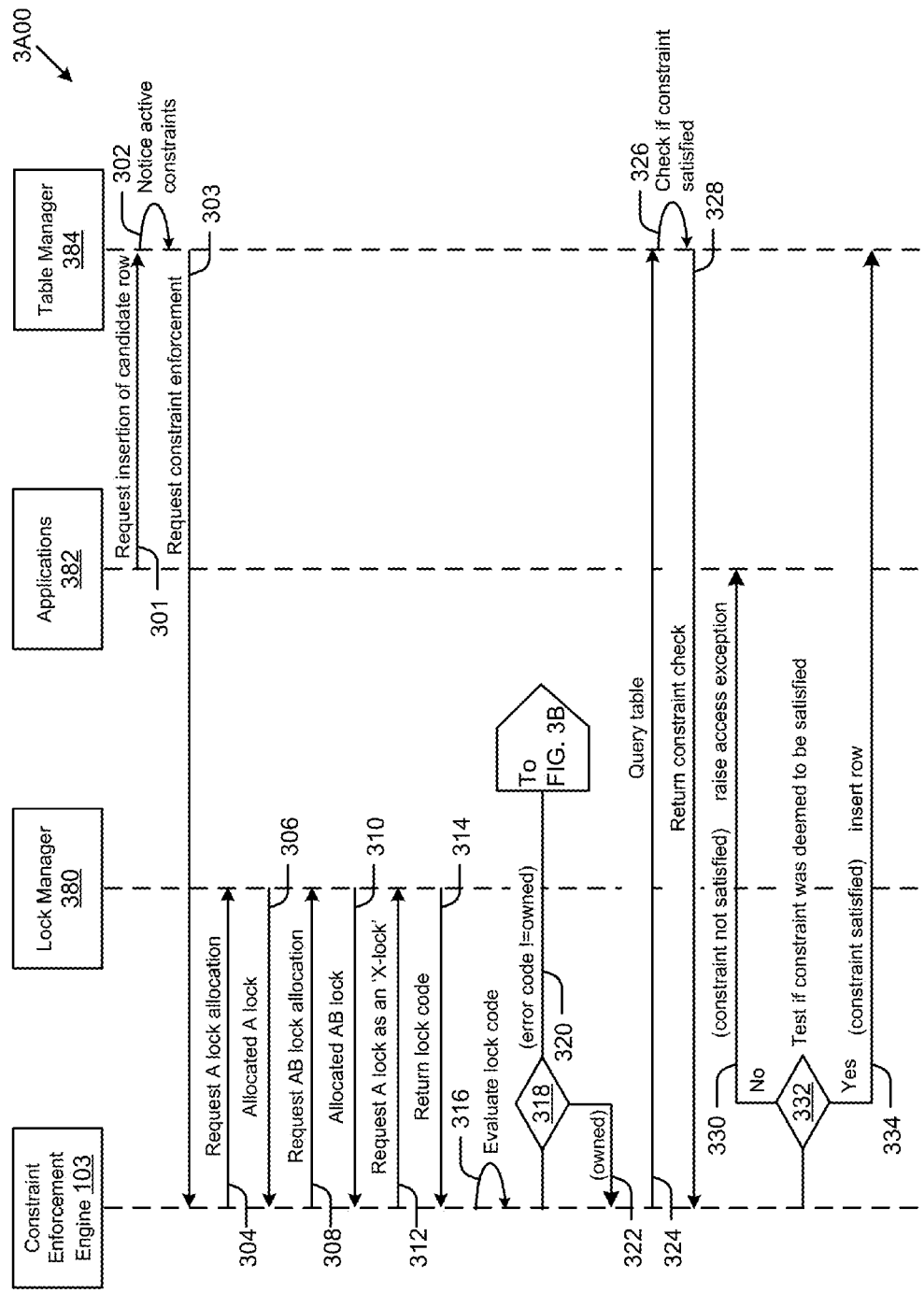
FIG. 3A depicts a first portion of a message protocol based on lock status when used in a system for implementing a multi-column/multi-row constraint when inserting rows into a relational database table, according to some embodiments.

FIG. 3A depicts a first portion of a message protocol 3A00 based on lock status when used in a system for implementing a multi-column/multi-row constraint when inserting rows into a relational database table. As an option, the present message protocol 3A00 may be implemented in the context of the architecture and functionality of the embodiments described herein. Also, the message protocol 3A00 or any aspect therein may be implemented in any desired environment.

As shown, software applications 382 make requests to insert a row into a table (see message 301), and some operational unit, in this case a table manager 384 looks-up or otherwise takes notice of the constraints that apply to the table (see operation 302). And in the instance shown, the table manager 384 sends a request (see message 303) to a constraint enforcement engine 103. In the example shown, at least the definitions of the two columns {columnA, columnB} pertaining to the multi-column/multi-row constraint covering the given row are accessible by the constraint enforcement engine 103.

Next, the constraint enforcement engine 103 allocates two shared access locks (e.g., "S locks)", one for the columnA value and one for the columnB value (e.g., see message 304 and see message 308). The lock manager 380 may satisfy the allocation requests (e.g., see message 306 and message 310), at which point the constraint enforcement engine 103 can request an exclusive mode lock (e.g., an "X-lock") on the columnA value (e.g., see message 312). The lock manager processes the request for an exclusive mode lock, and returns a lock code (see message 314). The status or value of the lock code is used to determine aspects of the then instantaneous concurrency, and the status or value of the lock code is used to determine next operations. Some exemplary next operations are discussed below, and further exemplary next operations are discussed in FIG. 3B and FIG. 3C.

The status or value of the lock code has various meanings, which meanings are used to determine next operations. As shown, the lock manager returns a lock code (see message 314) which is evaluated (see operation 316) by the constraint enforcement engine.

Strictly as an example, a lock manager might implement a lock request as follows:

| Synopsis |
| --- |
| DBMS_LOCK.REQUEST( |
|     id                    IN   INTEGER, |
|     lockhandle     IN   VARCHAR2, |
|     lockmode       IN   INTEGER   DEFAULT   X_MODE, |
|     timeout        IN   INTEGER   DEFAULT   MAXWAIT, |
|     release_on_commit  IN   BOOLEAN   DEFAULT   FALSE) |
| RETURN INTEGER; |

TABLE 2

Table Title

| Return Value (Integer values) | Description |
| --- | --- |
| 0 | Success |
| 1 | Timeout |
| 2 | Deadlock |
| 3 | Parameter error |
| 4 | Owned: Already owns lock specified |
| 5 | Illegal lock handle |

Continuing with the description of the message protocol 3A00, a test (e.g., see test 318) can direct the progression through the protocol using one or another selected sequence. In this case if the test 318 determines that the lock code was 'owned' (see branch 322), then the protocol progresses to query the table (see message 324) or if the test 318 determines that the lock code was not 'owned' (see branch 320), processing progress to a different portion of the protocol (e.g., see connector to FIG. 3B).

The operation to query the table sends a message (see message 324) to a table manager 384, which in turn checks if the constraint is satisfied (see operation 326). Note that the locks of the requested lock types are still in-use and operational (e.g., have not been released), so constraint checks performed by the table manager can proceed under the assumption that no intervening writes affecting the constrained columns can occur during the performance of the constraint checks; thus the constraint checks are performed within a safe critical region.

The table manager 384 returns results of the constraint checks (see message 328), and the progression through the protocol is responsive to the results of the constraint checks. As shown in this portion of message protocol 3A00, the multi-column/multi-row constraint is satisfied (see decision 332) and a message to insert the candidate rows into the table is delivered to the table manager (see message 334).

In an alternative situation, and as shown in this portion of message protocol 3A00, the multi-column/multi-row constraint is not satisfied (see message 328 and decision 332) and an access exception is raised to the caller (see message 330).

The particular assignment of operations and the particular sender/receiver relationships, and the particular names of the operational units (e.g., software application, table manager, lock manager, and constraint enforcement engine 103) are discussed here purely as examples, and the particular assignment of operations and the particular sender/receiver relationships may differ from implementation to implementation.

The foregoing describes one embodiment for enforcing a constraint in the case of a single application, or in the case of serialized insertion requests. As can be understood, in a serialized or non-concurrent transaction environment, a query to the table can confidently deem if a candidate insertion breaks the constraint or not, since all previous changes in the transaction are visible to all later actions.

However, in a concurrent environment that supports multiple applications or other techniques for processing multiple transactions concurrently, the aforementioned semaphore or other forms of a lock can be used to prevent multiple READ/WRITE accesses in critical regions—even in the presence of interleaved transactions.

Strictly as an example, consider the case when there are two concurrent transactions: transactionA and transactionB, any insertion made by transactionA are not visible to transactionB before transactionA commits its changes to the table manager. Unless certain preventive steps are taken (e.g., see FIG. 3B, FIG. 3C, and FIG. 4), if transactionB includes insertion of a new row that involves either of the columns named in the multi-column/multi-row constraint, the processing of transactionB can't be confident as to whether or not the new row violates the constraint until transactionA commits and the committed changes are made available to the table manager. Examples of preventive steps to be taken and under what conditions (e.g., responsive to lock status) are discussed briefly below.

Figure 3B:
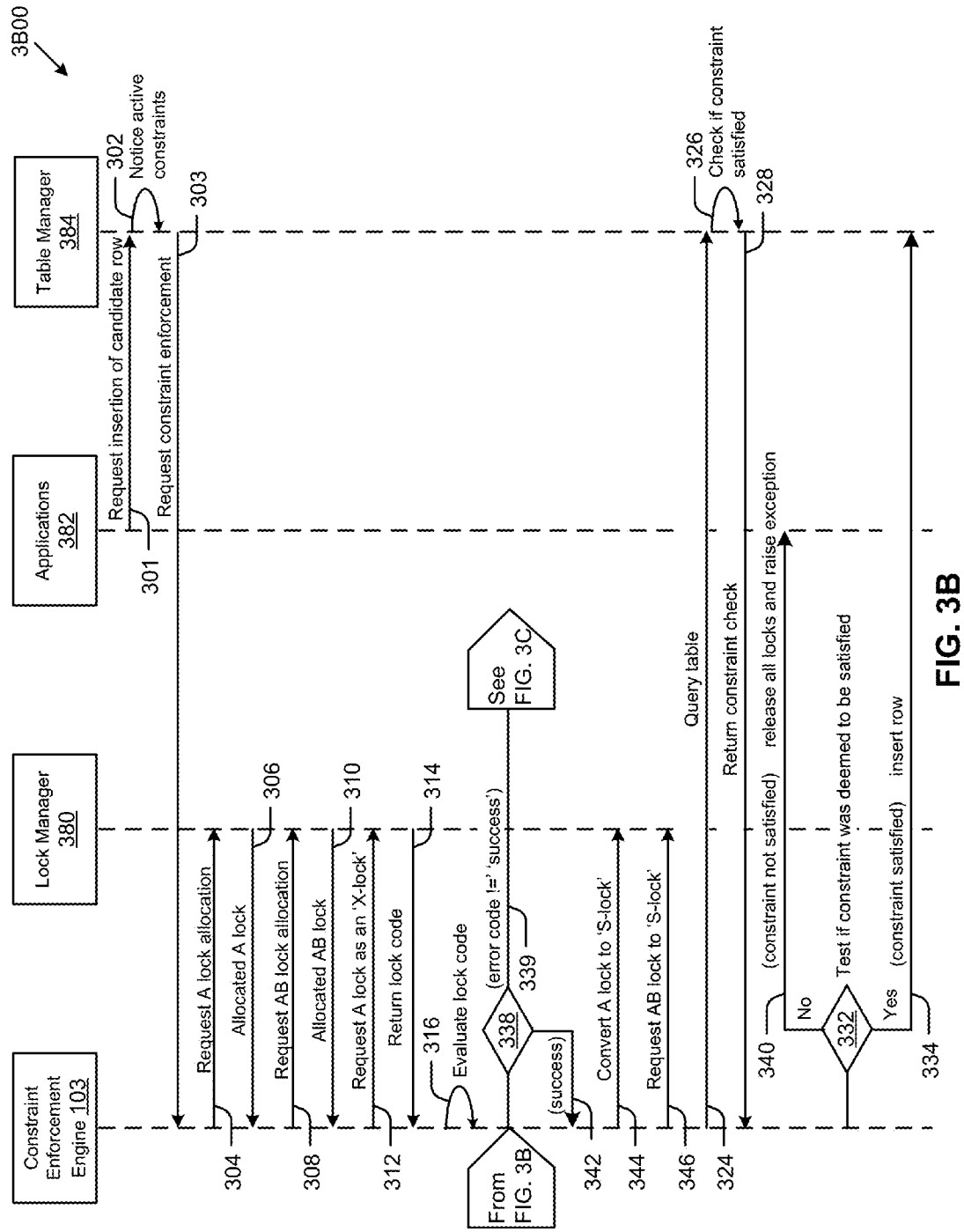
FIG. 3B depicts a second portion of a message protocol based on lock status when used in a system for implementing a multi-column/multi-row constraint when inserting rows into a relational database table, according to some embodiments.

FIG. 3B depicts a second portion of a message protocol 3B00 based on lock status when used in a system for implementing a multi-column/multi-row constraint when inserting rows into a relational database table. As an option, the present message protocol 3B00 may be implemented in the context of the architecture and functionality of the embodiments described herein. Also, the message protocol 3B00 or any aspect therein may be implemented in any desired environment.

As shown, and as earlier-described in the discussion of FIG. 3A, a software application (e.g., one of software applications 382) makes a request to insert a row into a table (see message 301), and some operational unit, in this case a table manager 384, looks-up or otherwise takes notice of the constraints that apply to the table. And, as shown, the table manager 384 sends a request to a constraint enforcement engine 103. In this example, at least the definitions of the two columns pertaining to the multi-column/multi-row constraint covering the given row are accessible by the constraint enforcement engine 103.

The protocol continues after evaluating the returned lock code (see operation 316). In the case shown, the decision responsive to the lock code return value being other than "success" (see decision 338) directs the protocol processing to steps shown in FIG. 3C. Or, the decision responsive to the lock code return value being "success" (see branch 342) directs the protocol processing to steps for conversion of the columnA value lock to a shared lock (see message 344), and to request a shared lock for the {columnA value, columnB value} (see message 346).

Having the requested locks, then in order to query the table the constraint enforcement engine 103 sends a message (see message 324) to a table manager 384, which in turn checks if the constraint is satisfied. The table manager 384 returns results of the constraint checks (see message 328), and the progression through the protocol is responsive to the result of the constraint check. As shown in this portion of message protocol 3B00, the multi-column/multi-row constraint is satisfied (see decision 332) and a message to insert the candidate rows into the table is delivered to the table manager (see message 334).

In an alternative situation, and as shown in this portion of message protocol 3B00 the multi-column/multi-row constraint is not satisfied (see decision 332) constraint enforcement engine processing releases all if its allocated locks from this pass and an exception is raised to the caller (see message 340).

Figure 3C:
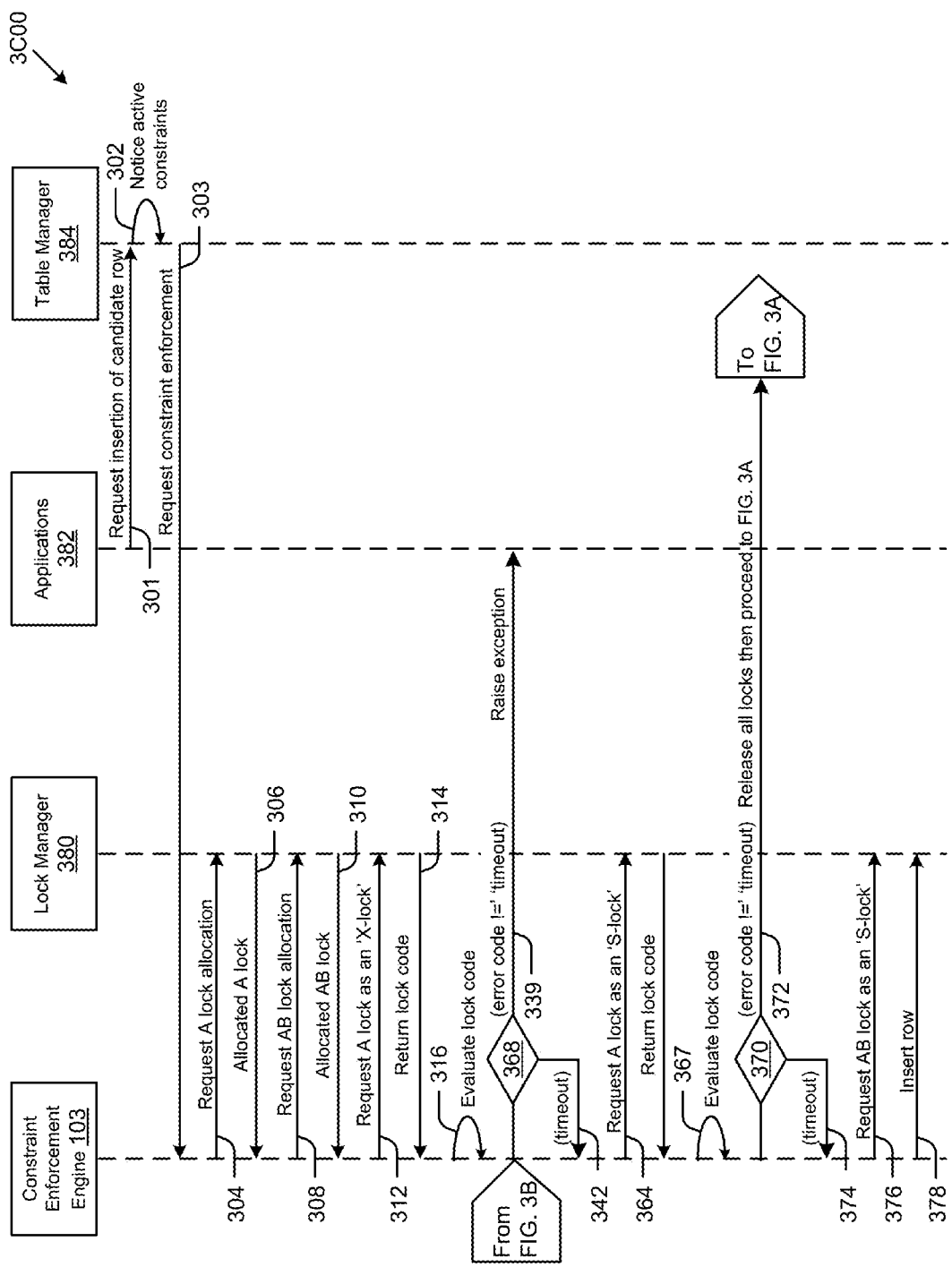
FIG. 3C depicts a third portion of a message protocol based on lock status when used in a system for implementing a multi-column/multi-row constraint when inserting rows into a relational database table, according to some embodiments.

FIG. 3C depicts a third portion of a message protocol 3C00 based on lock status when used in a system for implementing a multi-column/multi-row constraint when inserting rows into a relational database table. As an option, the present message protocol 3C00 may be implemented in the context of the architecture and functionality of the embodiments described herein. Also, the message protocol 3C00 or any aspect therein may be implemented in any desired environment.

As shown, and as earlier-described in the discussion of FIG. 3A, software applications (e.g., any number of instances of software applications 382) make requests to insert a row into a table (see message 301), and some operational unit, in this case a table manager 384 looks-up or otherwise takes notice of the constraints that apply to the table. And in the instance shown, the table manager 384 sends a request to a constraint enforcement engine 103. In the example shown, at least the definitions of the two columns pertaining to the multi-column/multi-row constraint covering the given row are accessible by the constraint enforcement engine 103.

At some point, the protocol continues after evaluating the returned lock code (see message 314). In the case shown, the decision responsive to the lock code return value being other than "timeout" (see decision 368) directs the protocol processing (e.g., see branch 339) to raise an exception (e.g., in the calling instance from among the software applications 382). Or, the decision responsive to the lock code return value being "timeout" (see decision 368) can direct the protocol processing to steps for requesting a first column shared lock (see message 364), and to evaluate the returned lock code (see operation 367).

Again, a decision responsive to the lock code return value being other than "timeout" (see decision 370) directs the protocol processing to release all locks (see branch 372). Or, the decision responsive to the lock code return value being "timeout" (see decision 370) directs the protocol processing via branch 374 to request an AB shared lock (see message 376), and the row is inserted (see message 378).

Again, the particular assignment of operations and the particular sender/receiver relationships, and the particular names of the operational units (e.g., software application, table manager, lock manager, constraint enforcement engine 103) are discussed here purely as examples, and the particular assignment of operations and the particular sender/receiver relationships may differ from implementation to implementation. In particular, a set of operations and decisions can be amalgamated into a single flow chart to aid understanding of an exemplary embodiment. Such a flow chart is presented in FIG. 4, and discussed in further detail hereunder.

Figure 4:
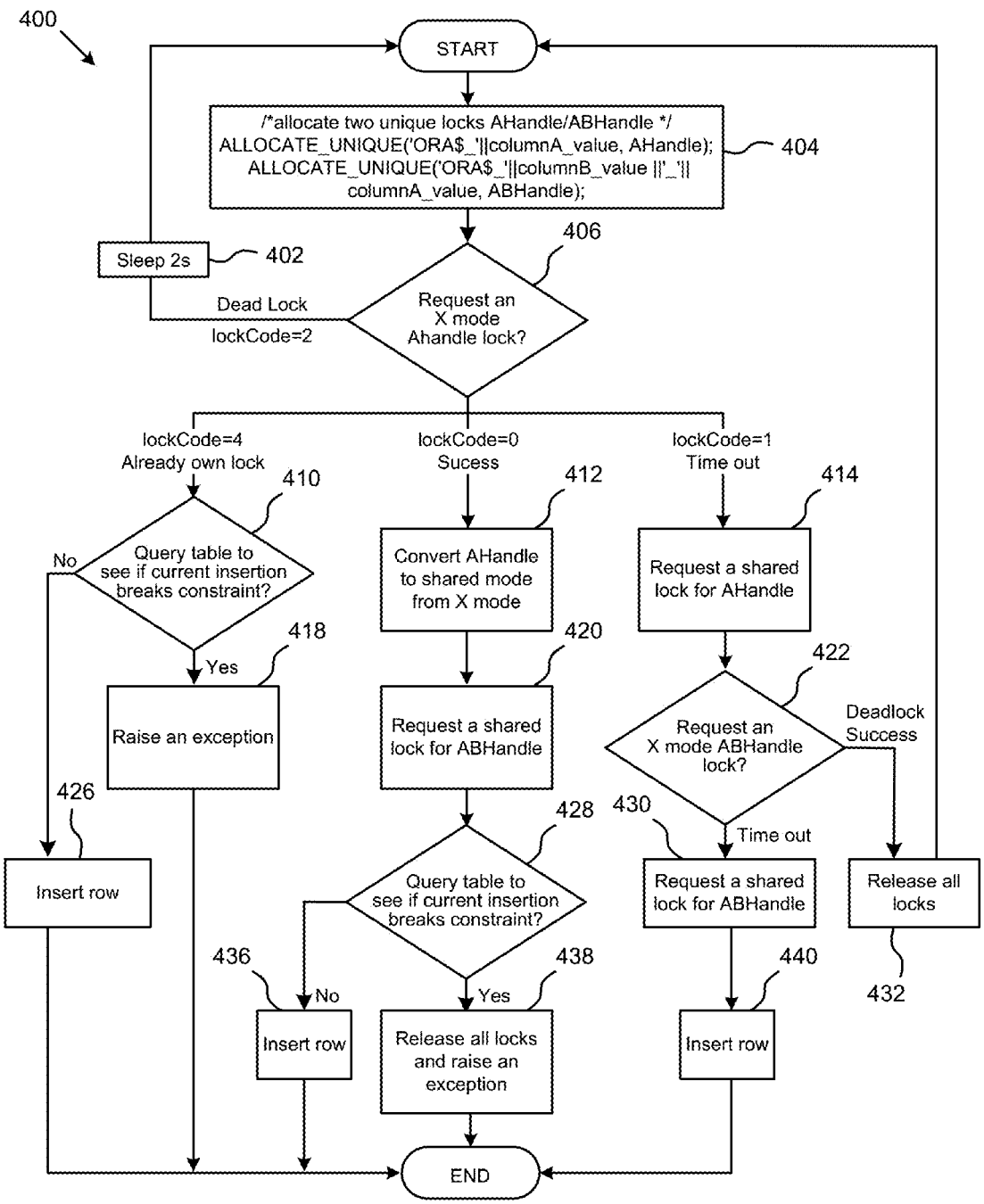
FIG. 4 is a flow chart used in a system for implementing a multi-column/multi-row constraint when inserting rows into a relational database table, according to some embodiments.

FIG. 4 is a flow chart 400 used in a system for implementing a multi-column/multi-row constraint when inserting rows into a relational database table. As an option, the present flow chart 400 may be implemented in the context of the architecture and functionality of the embodiments described herein. Also, the flow chart 400 or any aspect therein may be implemented in any desired environment.

As earlier mentioned, some of the embodiments herein include techniques to prevent "invalid" rows from being inserted into the table by checking the columns and rows just before insertion. Still further, the use of locks as discussed in this FIG. 4 serves the dual purposes of preventing invalid rows from being inserting into the table while reducing or eliminating serialization when it can be determined that a candidate insertion row could not possibly affect the validity of the constraint enforcement steps (e.g., by checking that a candidate row does not write conflicting value in either of the columns involved in the multi-column/multi-row constraint).

In dealing with these dual purposes, consider concurrent or nearly concurrent transactions, namely transactionA and transactionB, that each intend to insert a row that is subject to a multi-column/multi-row constraint. Consider the following situation:

In a concurrent environment, for example, there can occur concurrent transactions transactionA and transactionB.

Any insertion made by transactionA would not be visible to transactionB before transactionA commits. So if transactionB wants to insert a new row, it can't know whether or not the new row would violate the constraint until transactionA commits.

If transactionB is allowed to insert the new row, then after both transactions commit, there might then be conflicted rows in the table, which would violate the constraint. This situation is to be prevented.

If transactionB holds its action until transactionA commits, but if it happens that there are no conflicted rows in transactionA and transactionB, then the performance suffers because all transactions run sequentially, and no concurrent insertions are allowed in this situation. This situation is to be prevented.

The foregoing paragraphs have introduced a lock regime, enforced by a lock manager where a particular type of lock request is processed and returns one of six different return types. Exemplary calls and their meanings are detailed as follows:

In an allocation call (e.g., ALLOCATE_UNIQUE), a first lock name/handle is uniquely created corresponding to the value of columnA. If a transaction holds this lock, it means this transaction has inserted a row with this specific columnA value, and the insertion is not committed yet.

In a second allocation call (e.g., ALLOCATE_UNIQUE), a second lock name/handle is uniquely created with both values of columnA and columnB. If a transaction owns this lock, it means this transaction has inserted a row with this specific pair {columnA value, columnB value}, and the insertion is not committed yet.

If any two transactions insert rows with the same columnA value (or a same columnA value and columnB value pair), they will contend for the same lock, because function ALLOCATE_UNIQUE returns the same lock handle for the same lock names.

By calling the two locks defined above (e.g., by calling the routine ALLOCATE_UNIQUE), a transaction can indirectly detect if other transactions are working on the same columnA_value or are working on the same columnA_value/columnB_value pair. For example:

If a transaction can successfully acquire an exclusive mode lock on a specific columnA_value, that means no other open transactions are working on the same value of columnA. So for the current transaction, it just needs to query the table to see if the new row breaks the constraint, and then raises an exception (in the case of an invalid row) or makes the insertion into the table (in the case of a valid row insertion).

If a transaction can't successfully acquire an exclusive mode lock on a specific columnA_value, that means another open transaction is holding the lock, and is also in the process of inserting a row with same columnA_value.

Besides providing the aforementioned indirect communication mechanism, different modes (e.g., exclusive 'X-lock' and shared 'S-lock') of these two locks are also used to distinguish different situations and to coordinate row insertions among concurrent transactions.

As shown, the flow commences at START, upon which commencement two locks are allocated, namely, a lock allocation for {columnA value} and a lock allocation for the {columnA value, columnB value}, as depicted in step 404. Then the flow requests an exclusive mode lock for the A column, and the flow receives a response resulting from the exclusive mode lock request. Responsive to the exclusive mode lock request, one of two paths are taken (see binary decision 406). In one case, the exclusive mode lock request results in a deadlock, in which case the flow will sleep the requesting process for a duration (see operation 402) by posting a wait event and will attempt the allocation again after the sleep time expiration. In another case, after the binary decision 406, one of three flows is selected (e.g., flow through decision 410, flow through operation 412 or flow through operation 414, the selection being responsive to the lock code resulting from the exclusive mode lock request. The shown three flows correspond one-to-one to the value of the lock code resulting from the exclusive mode lock request. In this example:

lock code='already own the requested lock':
This situation reflects existence of an exclusive lock for the needed critical region to check the constraints and if OK (see decision 410) the insert the row (see operation 426). Thus, insert the row if the constraint is satisfied. Otherwise raise an exception (see operation 418) or otherwise alert the caller that the row violates the multi-column/multi-row constraint.

lock code='success':
Convert the exclusive lock into a shared lock (see operation 412) to allow other processes to perform certain intervening operations, and request a shared AB lock (see operation 420) then if the constraint is satisfied (see decision 428) insert the row (see operation 436). Otherwise raise an exception (see operation 438) or otherwise alert the caller that the row violates the multi-column/multi-row constraint.

lock code='timeout:
This situation can arise when other processes are writing to the table. Processing in this branch includes (i) requesting a shared A lock for (see operation 414) (ii) requesting an exclusive mode AB lock, and recognizing the (possible) existence of a (temporary) deadlock (see decision 422), then (iii) releasing previously secured locks (see operation 432), and (vi) beginning anew from START. In the event that after requesting an exclusive mode AB lock, the request times-out, then requesting a shared AB lock (see decision 422 and operation 430), then inserting the row (see operation 440).

Figure 5:
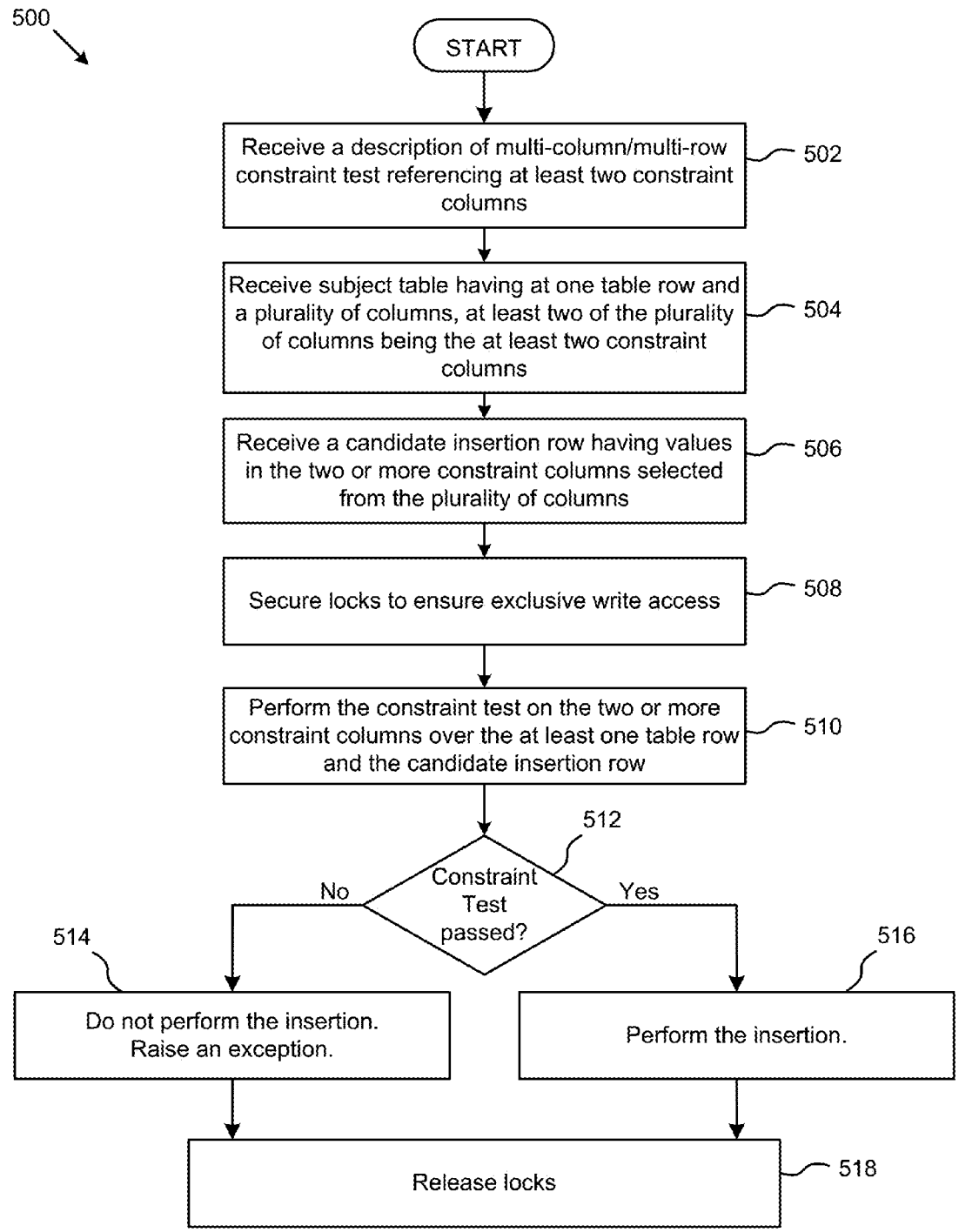
FIG. 5 exemplifies row insertion activity based on lock status as used in a system for implementing a multi-column/multi-row constraint when inserting rows into a relational database table, according to some embodiments.

FIG. 5 exemplifies row insertion activity 500 based on lock status as used in a system for implementing a multi-column/multi-row constraint when inserting rows into a relational database table. As an option, the present row insertion activity 500 may be implemented in the context of the architecture and functionality of the embodiments described herein. Also, the row insertion activity 500 or any aspect therein may be implemented in any desired environment.

As shown, the activity 500 commences upon receiving a description of a multi-column/multi-row constraint test referencing at least two constraint columns (see operation 502); receiving a subject table having at least two rows that include the at least two constraint columns (see operation 504); receiving a candidate insertion row having values in the at least two constraint columns (see operation 506); secure locks to ensure exclusive write access (see operation 508); perform the constraint test on the two or more constraint columns over the at least two rows (see operation 510); determine if the constraint test passed (see decision 512); then:

do not perform the insertion and raise an exception if the constraint test did not pass (see operation 514); or perform the insertion if the constraint test had passed (see operation 516).

Release locks to end activity 500 (see operation 518).

Additional Embodiments of the Disclosure

Figure 6:
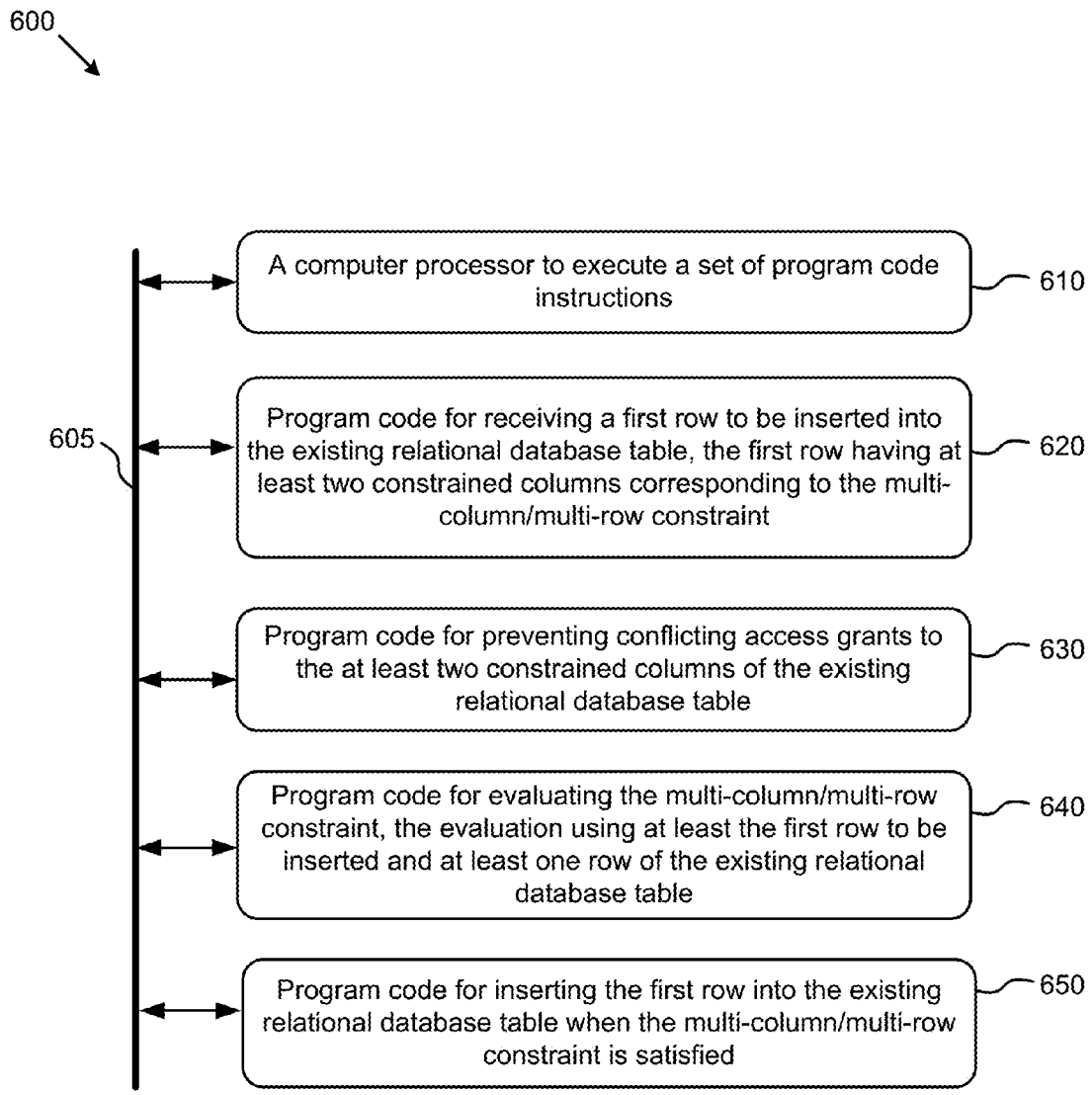
FIG. 6 is a system implementing a multi-column/multi-row constraint when inserting rows into a relational database table, according to some embodiments.

FIG. 6 is a system for implementing a multi-column/multi-row constraint when inserting rows into a relational database table, according to some embodiments. As an option, the present system 600 may be implemented in the context of the architecture and functionality of the embodiments described herein. Of course, however, the system 600 or any operation therein may be carried out in any desired environment. As shown, system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The embodiment of FIG. 6 implements a portion of a computer system, shown as system 600, comprising a computer processor to execute a set of program code instructions (see module 610) and modules for accessing memory to hold program code instructions to perform: receiving a first row to be inserted into the existing relational database table, the first row having at least two constrained columns corresponding to the multi-column/multi-row constraint (see module 620); preventing conflicting access grants to the at least two constrained columns of the existing relational database table (see module 630); evaluating the multi-column/multi-row constraint, the evaluation using at least the first row to be inserted and at least one row of the existing relational database table (see module 640); and inserting the first row into the existing relational database table when the multi-column/multi-row constraint is satisfied (see module 650).

System Architecture Overview

Figure 7:
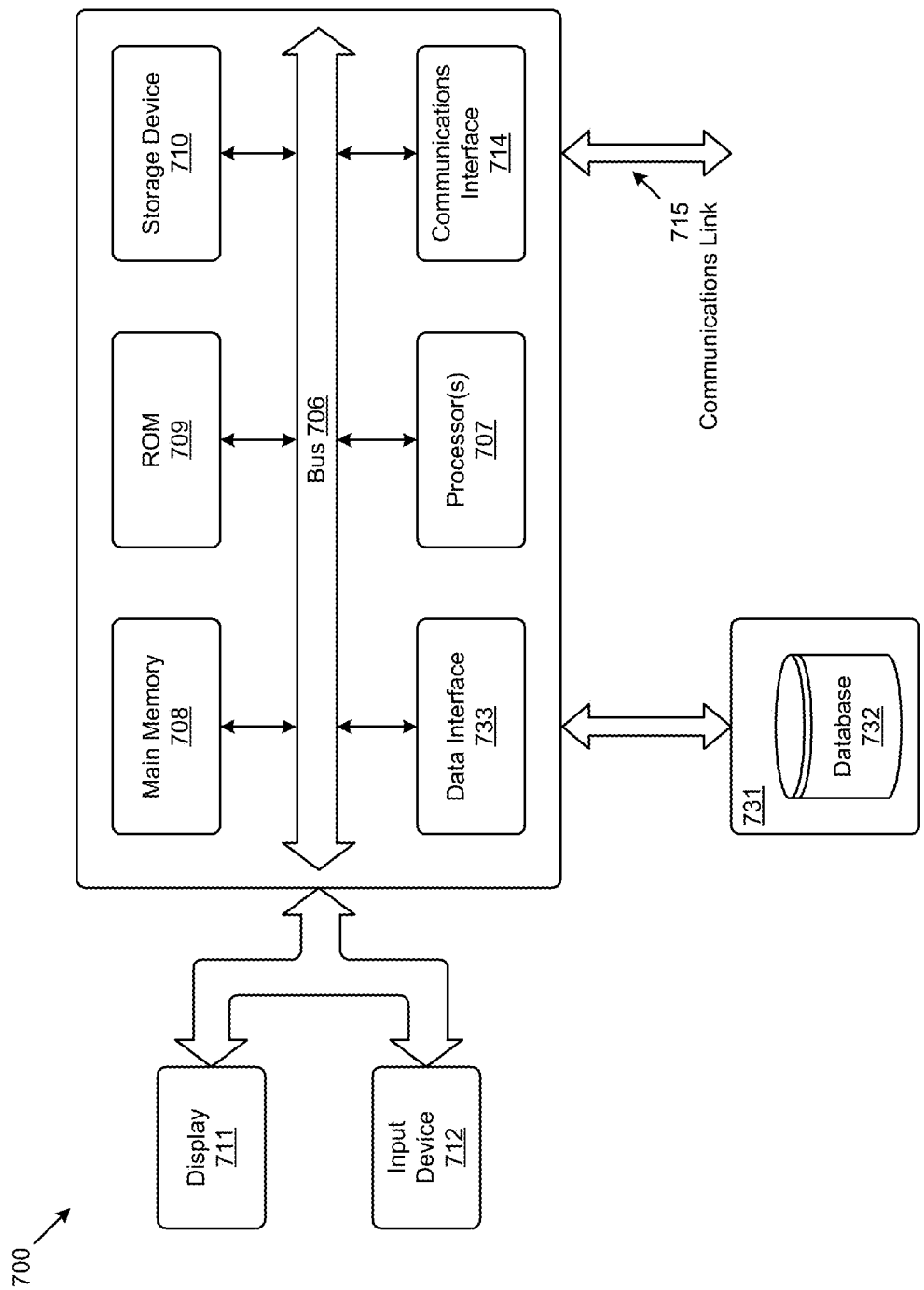
FIG. 7 depicts a block diagram of an instance of a computer system suitable for implementing an embodiment of the present disclosure.

FIG. 7 depicts a block diagram of an instance of a computer system 700 suitable for implementing an embodiment of the present disclosure. Computer system 700 includes a bus 706 or other communication mechanism for communicating information, which interconnects subsystems and devices, such as a processor 707, a system memory 708 (e.g., RAM), a static storage device (e.g., ROM 709), a disk drive 710 (e.g., magnetic or optical), a data interface 733, a communication interface 714 (e.g., modem or Ethernet card), a display 711 (e.g., CRT or LCD), input devices 712 (e.g., keyboard, cursor control), and an external data repository 731.

According to one embodiment of the disclosure, computer system 700 performs specific operations by processor 707 executing one or more sequences of one or more instructions contained in system memory 708. Such instructions may be read into system memory 708 from another computer readable/usable medium, such as a static storage device or a disk drive 710. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 700. According to certain embodiments of the disclosure, two or more computer systems 700 coupled by a communications link 715 (e.g., LAN, PTSN, or wireless network) may perform the sequence of instructions required to practice the disclosure in coordination with one another.

Computer system 700 may transmit and receive messages, data, and instructions, including programs (e.g., application code), through communications link 715 and communication interface 714. Received program code may be executed by processor 707 as it is received, and/or stored in disk drive 710 or other non-volatile storage for later execution. Computer system 700 may communicate through a data interface 733 to a database 732 on an external data repository 731. A module as used herein can be implemented using any mix of any portions of the system memory 708, and any extent of hard-wired circuitry including hard-wired circuitry embodied as a processor 707.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for implementing a multi-column/multi-row constraint when two or more concurrently running transactions are inserting rows into one relational database table, the method comprising:
receiving a first row to be inserted into the one relational database table for a first transaction of the two or more concurrently running transactions, the first row having first values in at least two constrained columns corresponding to the multi-column/multi-row constraint, wherein the multi-column/multi-row constraint operates concurrently on multiple columns and multiple rows in the one relational database table;
receiving a second row to be inserted into the one relational database table for a second transaction of the two or more concurrently running transactions, the second row having second values in the at least two constrained columns corresponding to the multi-column/multi-row constraint;
preventing conflicting access grants to the at least two constrained columns of the one relational database table by evaluating the first values and the second values, wherein preventing the conflicting access grants comprises using a column lock to lock one or more columns of the at least two constrained columns with a specified column value;
evaluating the multi-column/multi-row constraint using at least one of the first row and the second row to be inserted and at least one row of the one relational database table; and
inserting the first row and/or second row into the one relational database table when the multi-column/multi-row is satisfied.

2. The method of claim 1, wherein preventing conflicting access grants comprises denying access grants when one of the first values is different from a corresponding one of the second values.

3. The method of claim 1, wherein preventing conflicting access grants comprises allowing access grants when the first values do not differ from the corresponding second values.

4. The method of claim 1, wherein preventing conflicting access grants comprises granting the first row an exclusive access to the at least two constrained columns.

5. The method of claim 1, wherein preventing conflicting access grants to the two constrained columns of the one relational database table comprises an access exception.

6. The method of claim 1, wherein the column lock has a lock name that corresponds to the specified column value, such that a transaction that holds the column lock has inserted a row having the specified column value.

7. The method of claim 1, wherein preventing conflicting access grants comprises:
creating a lock on one or more columns of the at least two constrained columns with a respective value of the first values in the one or more locked columns;
acquiring the lock as an exclusive access lock for the first row when no other concurrent transactions has a same column value in the one or more locked columns as the respective value; and
acquiring the lock as a shared lock when any of other concurrent transactions has a same column value in the one or more locked columns as the respective value.

8. A computer system for implementing a multi-column/multi-row constraint when two or more concurrently running transactions are inserting rows into one relational database table, comprising:
a computer processor to execute a set of program code instructions; and
a memory to hold the program code instructions, in which the program code instructions comprises program code to perform,
receiving a first row to be inserted into the one relational database table for a first transaction of the two or more concurrently running transactions, the first row having first values in at least two constrained columns corresponding to the multi-column/multi-row constraint, wherein the multi-column/multi-row constraint operates concurrently on multiple columns and multiple rows in the one relational database table;
receiving a second row to be inserted into the one relational database table for a second transaction of the two or more concurrently running transactions, the second row having second values in the at least two constrained columns corresponding to the multi-column/multi-row constraint;
preventing conflicting access grants to the at least two constrained columns of the one relational database table by evaluating the first values and the second values, wherein preventing the conflicting access grants comprises using a column lock to lock one or more columns of the at least two constrained columns with a specified column value;
evaluating the multi-column/multi-row constraint using at least one of the first row and the second row to be inserted and at least one row of the one relational database table; and
inserting the first row and/or second row into the one relational database table when the multi-column/multi-row constraint is satisfied.

9. The computer system of claim 8, wherein preventing conflicting access grants comprises denying access grants when one of the first values is different from a corresponding one of the second values.

10. The computer system of claim 8, wherein preventing conflicting access grants comprises allowing access grants when the first values do not differ from the corresponding second values.

11. The computer system of claim 8, wherein preventing conflicting access grants comprises granting the first row an exclusive access to the at least two constrained columns.

12. The computer system of claim 8, wherein preventing conflicting access grants to the two constrained columns of the one relational database table comprises an access exception.

13. The computer system of claim 8, wherein the column lock has a lock name that corresponds to the specified column value, such that a transaction that holds the column lock has inserted a row having the specified column value.

14. The computer system of claim 8, wherein preventing conflicting access grants comprises:
creating a lock on one or more columns of the at least two constrained columns with a respective value of the first values in the one or more locked columns;
acquiring the lock as an exclusive access lock for the first row when no other concurrent transactions has a same column value in the one or more locked columns as the respective value; and acquiring the lock as a shared lock when any of other concurrent transactions has a same column value in the one or more locked columns as the respective value.

15. A computer program product embodied in a non-transitory computer readable medium, the computer readable medium having stored thereon a sequence of instructions which, when executed by a processor causes the processor to execute a process to implement a multi-column/multi-row constraint when two or more concurrently running transactions are inserting rows into one relational database table, the process comprising:
receiving a first row to be inserted into the one relational database table for a first transaction of the two or more concurrently running transactions, the first row having first values in at least two constrained columns corresponding to the multi-column/multi-row constraint, wherein the multi-column/multi-row constraint operates concurrently on multiple columns and multiple rows in the one relational database table;
receiving a second row to be inserted into the one relational database table for a second transaction of the two or more concurrently running transactions, the second row having second values in the at least two constrained columns corresponding to the multi-column/multi-row constraint;
preventing conflicting access grants to the at least two constrained columns of the one relational database table by evaluating the first values and the second values, wherein preventing the conflicting access grants comprises using a column lock to lock one or more columns of the at least two constrained columns with a specified column value;
evaluating the multi-column/multi-row constraint using at least one of the first row and the second row to be inserted and at least one row of the one relational database table; and
inserting the first row and/or second row into the one relational database table when the multi-column/multi-row constraint is satisfied.

16. The computer program product of claim 15, wherein preventing conflicting access grants comprises denying access grants when one of the first values is different from a corresponding one of the second values.

17. The computer program product of claim 15, wherein preventing conflicting access grants comprises allowing access grants when the first values do not differ from the corresponding second values.

18. The computer program product of claim 15, wherein preventing conflicting access grants comprises granting the first row an exclusive access to the at least two constrained columns.

19. The computer program product of claim 15, wherein the column lock has a lock name that corresponds to the specified column value, such that a transaction that holds the column lock has inserted a row having the specified column value.

20. The computer program product of claim 15, wherein preventing conflicting access grants comprises:
creating a lock on one or more columns of the at least two constrained columns with a respective value of the first values in the one or more locked columns;
acquiring the lock as an exclusive access lock for the first row when no other concurrent transactions has a same column value in the one or more locked columns as the respective value; and
acquiring the lock as a shared lock when any of other concurrent transactions has a same column value in the one or more locked columns as the respective value.

* * * * *